Figure 1:
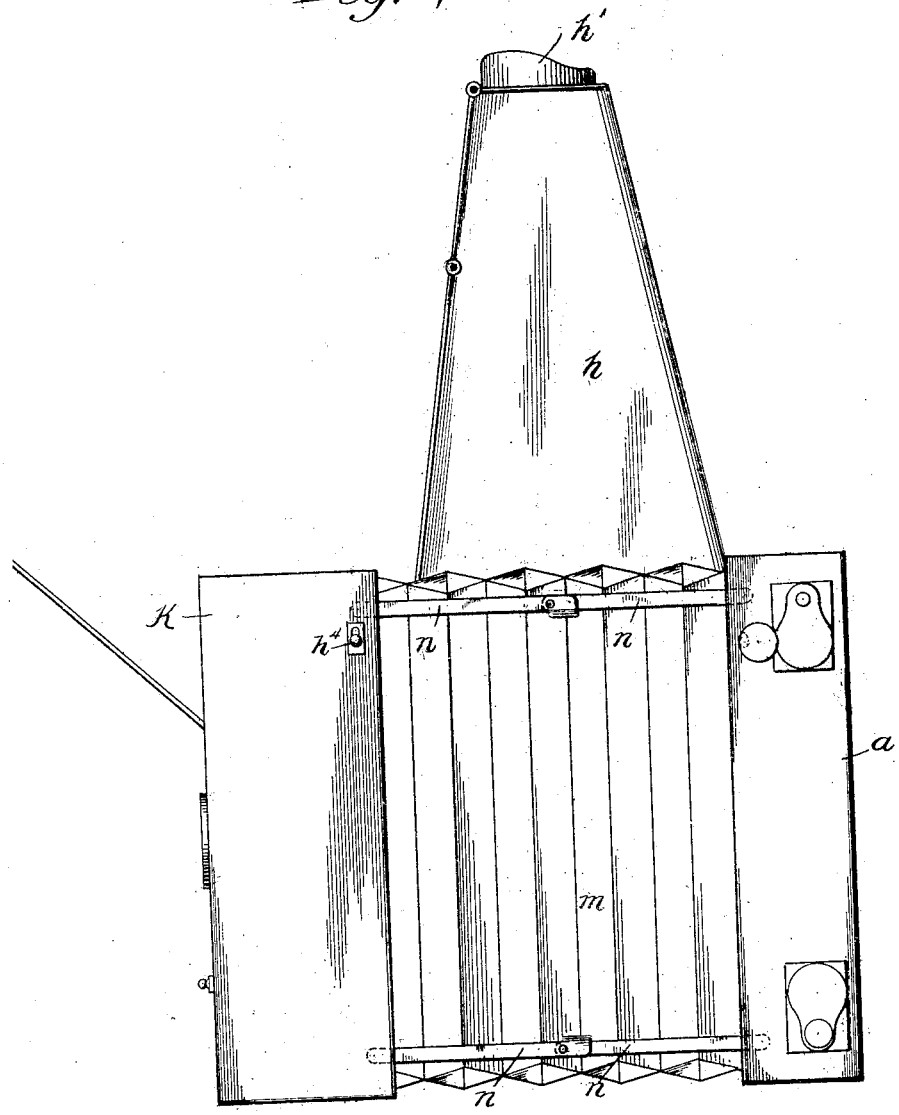

No. 858,145. PATENTED JUNE 25, 1907.
L. BORSUM.
PHOTOGRAPHIC CAMERA.
APPLICATION FILED APR. 17, 1905.

4 SHEETS—SHEET 1.

WITNESSES:
L. J. Browning
Philip Caron

INVENTOR
Louis Borsum
BY
Edward C. Davidson
ATTORNEY

No. 858,145.  
PATENTED JUNE 25, 1907.
L. BORSUM.  
PHOTOGRAPHIC CAMERA.  
APPLICATION FILED APR. 17, 1905.
4 SHEETS—SHEET 2.
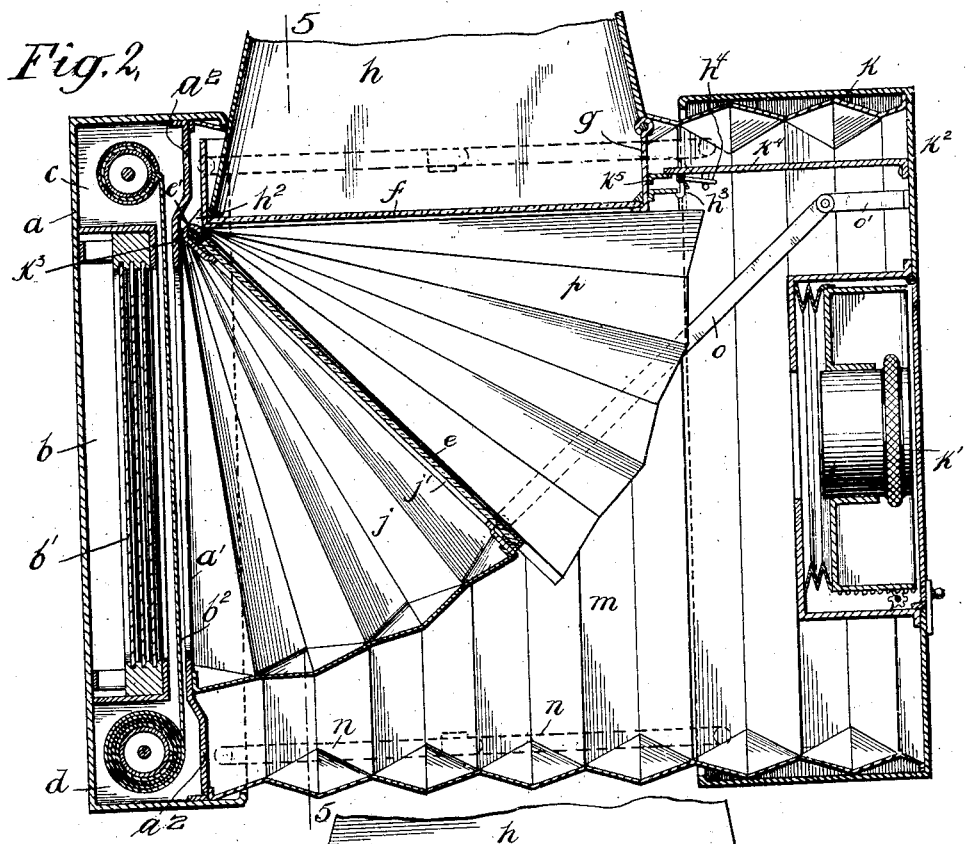
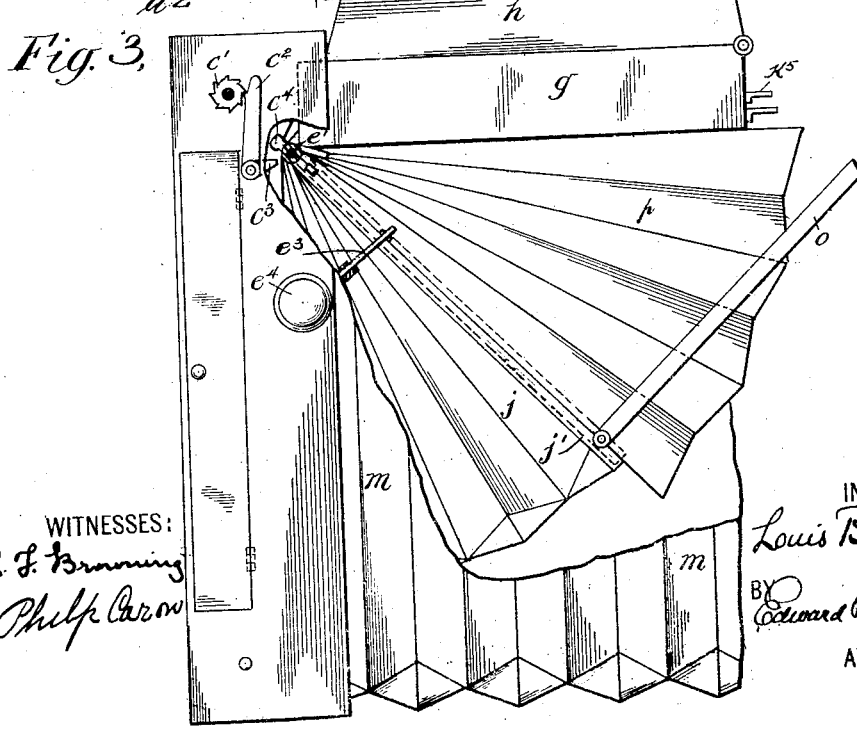
WITNESSES:  
INVENTOR  
Louis Borsum  
BY Edward C. Davidson  
ATTORNEY No. 858,145. PATENTED JUNE 25, 1907.
L. BORSUM.
PHOTOGRAPHIC CAMERA.
APPLICATION FILED APR. 17, 1905.
4 SHEETS—SHEET 3.
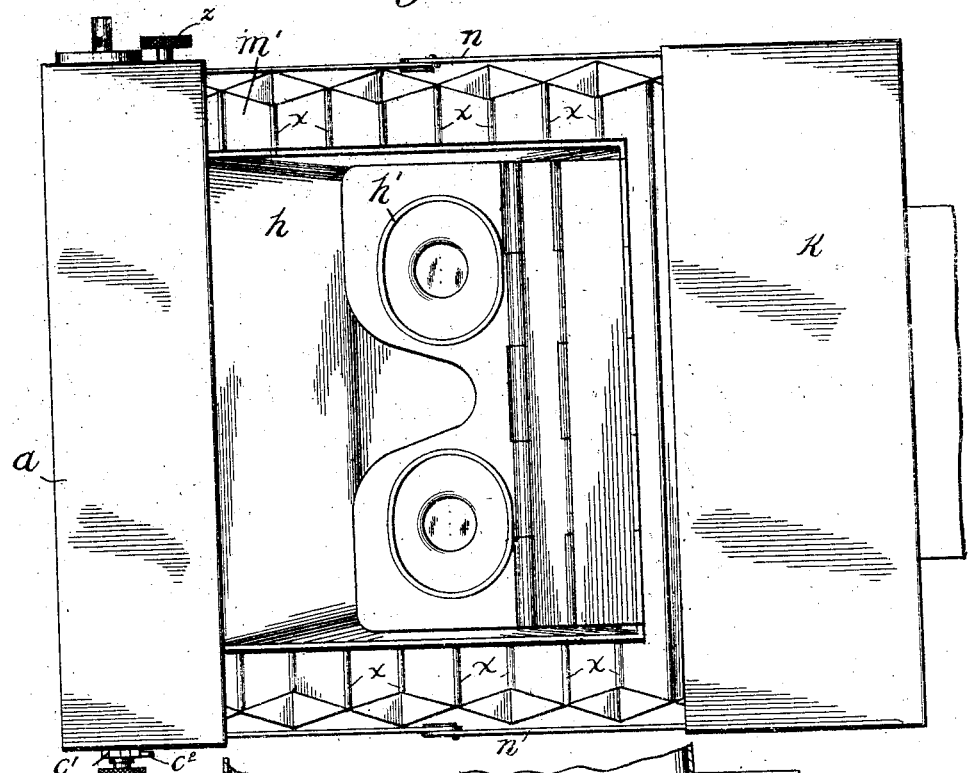
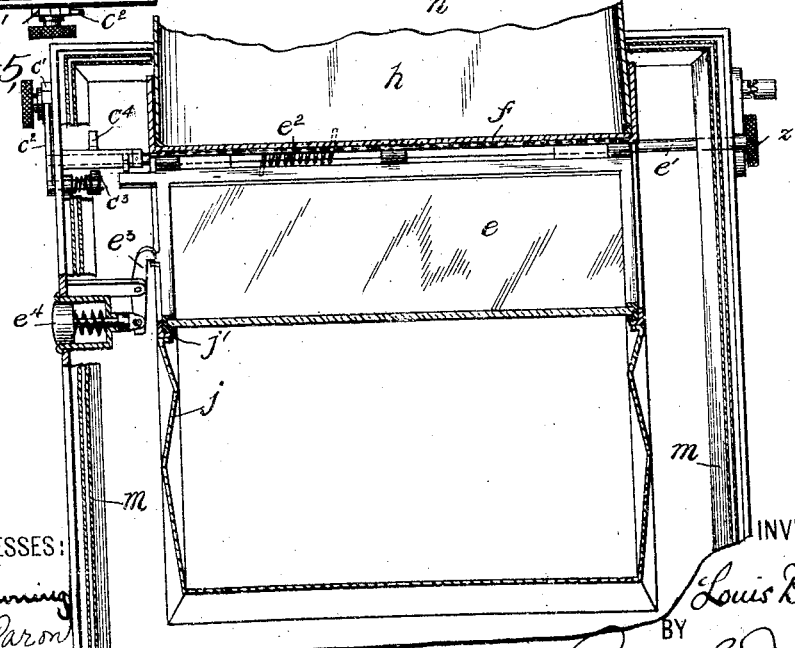
WITNESSES:
L. L. Browning
Philip Caron
INVENTOR
Louis Borsum
BY
Edward C. Davidson
ATTORNEY No. 858,145. PATENTED JUNE 25, 1907.
L. BORSUM.
PHOTOGRAPHIC CAMERA.
APPLICATION FILED APR. 17, 1905.
4 SHEETS—SHEET 4.
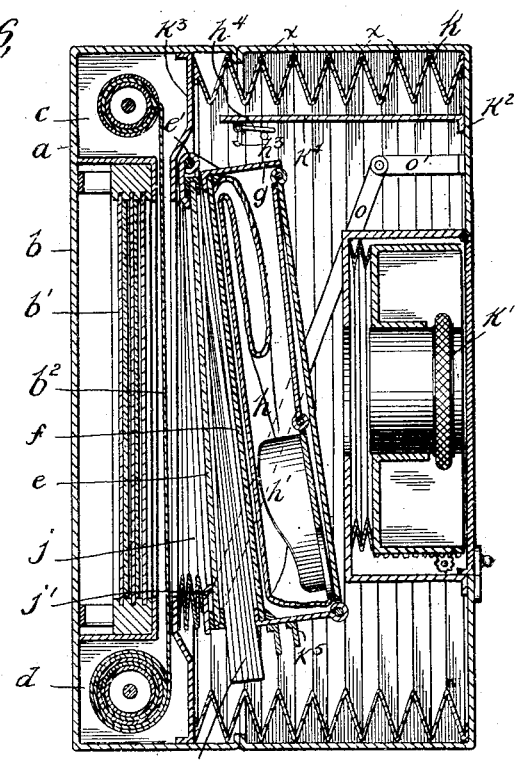
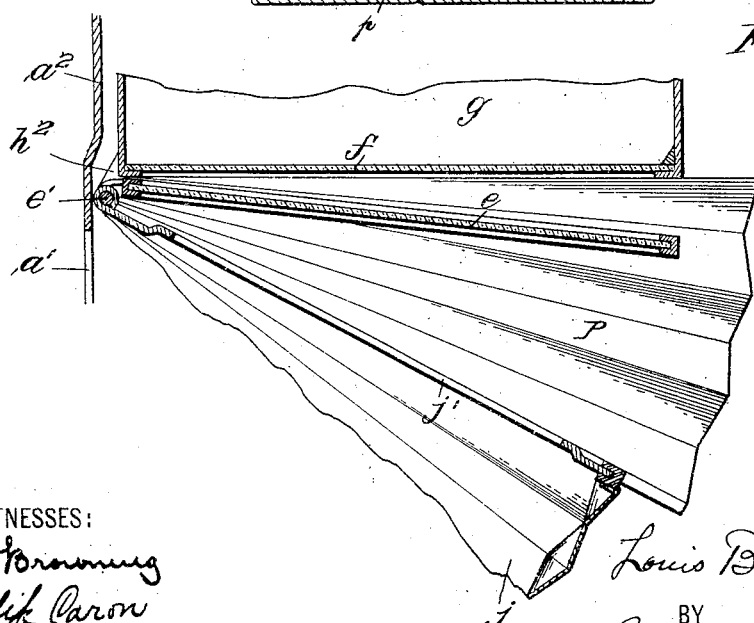
WITNESSES:
INVENTOR
Louis Borsum
BY
Edward C. Davidson
ATTORNEY

UNITED STATES PATENT OFFICE.

LOUIS BORSUM, OF PLAINFIELD, NEW JERSEY.

PHOTOGRAPHIC CAMERA.

No. 858,145.　　　Specification of Letters Patent.　　　Patented June 25, 1907.

Application filed April 17, 1905. Serial No. 256,139.

*To all whom it may concern:*

Be it known that I, LOUIS BORSUM, a citizen of the United States, residing at Plainfield, county of Union, State of New Jersey, have invented certain new and useful Improvements in Photographic Cameras, of which the following is a specification.

This invention relates to cameras known in the trade as reflex cameras, an example of which is disclosed in the United States patent to L. J. R. Holst, No. 720,693, dated Feby. 17, 1903. Such cameras comprise, intermediate the focal plane and lens, a mirror arranged at an angle of forty-five degrees, that reflects the image upwardly against a focusing ground glass in the top of the camera box.

The purpose of this invention is to provide a structure wherein the front member, carrying the lens, may be collapsed or folded rearwardly against the rear member carrying the focal plane shutter and plate holder, the parts being readily drawn apart by extension of a connecting collapsible structure or bellows, within which the hinged reflecting mirror is contained. With such a construction all of the advantages of the reflex camera are retained; while its normal bulk is materially reduced.

In the accompanying drawing: Figure 1 is a side elevation with the bellows structure, between the front and rear member of the camera, extended and the observation hood elevated for use. Fig. 2 is a longitudinal section with the observation hood extended for use but broken away. Fig. 3 is a side elevation of the rear or shutter end of the camera with the collapsing bellows interposed between it and the front member broken away. Fig. 4 is a plan with the cover of the chamber, in which the observation hood is packed, removed. Fig. 5 is a transverse section on the line 5, 5 of Fig. 2; Fig. 6, is a longitudinal section showing the camera folded or collapsed; and Fig. 7 an enlarged detail view showing the relation of some of the parts.

The rigid, box-like rear member $a$ is formed with a plate holding chamber $b$ and upper and lower shutter-roll chambers $c$, $d$.

$b'$ indicates an ordinary plate holder and $b^2$ an ordinary focal plane shutter of any appropriate construction. On the end of the axis of the upper shutter roll is the usual ratchet wheel $c'$ engaged by a detent pawl $c^2$, the axis of which extends to the inside of the box and has a radially projecting arm $c^3$ that is struck by a projection $c^4$, on the rotatable axis of the focusing mirror $e$, when the latter is swung upwardly out of the path of the light cone. This construction is common and well understood and is sufficiently indicated in the drawing.

$e'$ is the axis of the swinging mirror mounted in suitable bearings in the side walls of the rear member $a$ and having applied to it a spring $e^2$ that tends normally to throw the mirror upwardly toward or against the ground glass $f$ forming the bottom of the box or chamber $g$ in the top of the camera box and within which is normally folded the collapsible observation hood $h$ provided at its upper end with appropriate eye pieces or observation apertures $h'$. The mirror, when the camera is extended for use, is normally held down by a latch $e^3$ controlled by a spring supported push button $e^3$ in the side wall of the rear box or member $a$.

At the rear lower corner of the box $g$ project strips $h^2$ through which the shaft $e'$ of the mirror loosely extends. The box, therefore, may swing upon such hinge joint for purpose of collapsing the camera as seen in Fig. 6. When the camera is extended, however, as in Fig. 2, the box may be lifted by means of the hood, or otherwise, into position shown and there retained by means of a latch $h^3$ released by a button $h^4$ extending (Figs. 1 and 2) through the front member of the camera and which when raised withdraws the latch from the box so that the latter may be folded downwardly.

Extending rearwardly from the front board $k^2$ is a horizontal plate $k^4$ against the under side of the rear edge of which a flange or lip $k^5$ on the front of box $g$ abuts when the box is raised, as in Fig. 2. This serves as a guard against admission of light that might enter along the front of the box $g$. Attached around the two sides and bottom of the exposure opening $a'$ in the front board of the rear member $a$, is a collapsible segmental bellows $j$ at the apex of which is the axis $e'$ of the mirror. The curved lower end of this segmental bellows is closed, but its front face is open and is surrounded by a flat stiff rim $j'$ upon which the frame, containing the mirror, rests; and the back of the mirror being opaque, light is entirely excluded from the interior of the bellows when the mirror is in its lower position, as in Fig. 2, in which it is normally held by the latch $e^3$.

The front box or member $k$ of the camera carries the lens $k'$ and is connected by a bellows $m$ attached to the front board $k^2$ to the board $a^2$, of the rear box $a$, in which the exposure opening $a'$ is formed. The upper side of this bellows is formed with a square opening within which the box $g$ fits. The bellows at the sides of this box are shown in Fig. 4 being marked $m'$. The front and rear members of the camera are connected by folding toggle links $n$ of well known construction which hold the two members separated and the bellows extended, as in Fig. 2, but which may be collapsed when pressed toward each other to permit folding of the camera as in Fig. 6. When the front and rear members of the camera are drawn apart, links $o$ pivoted to the ends of posts $o'$ on the front board $k^2$, and pinned to the sides of the frame $j'$ surrounding the open front face of segmental bellows $j$, (Fig. 7) draw the bellows forwardly and carry with it the mirror $e$ lying upon the frame. When the camera is completely extended as in Fig. 2 the mirror is held at an angle of 45°, and the box $g$ supported by latch $h^3$ fits closely in the opening in the top of the bellows, light being excluded. A second segmental bellows $p$ whose closed apex is at the rear lower corner of box $g$ has its sides connected to that box and to the sides of frame $j'$ of the bellows $j$. The front curved end of bellows $p$ is open to admit rays of light from the lens to the mirror which may be swung up and down within the bellows, and the sides of the latter at the top are extended beyond or in front of box $g$ to exclude light should it leak in at the sides of the box.

The mirror when thrown down by the usual thumb button $z$ applied to its shaft $e'$, is held by latch $e^3$: and, the observation hood being extended, the image of a picture to be taken is received upon the mirror and reflected upwardly upon the ground-glass $f$ upon which it is focused. When the image has been focused, pressure upon the button $e^4$ releases the mirror which is thrown up by its spring $e^2$ against the box $g$ closing the camera against entrance of light through the ground glass; and, when the mirror has about reached its most elevated position, the shutter is tripped by the action of projection $c^4$ upon the latch $c^2$, $c^3$ (Fig. 3). The front lower edge of the extended segmental bellows $j$ is placed at such an elevation as not to intercept rays of light entering through the lens. To fold the camera, the toggle links on each side are pressed toward each other, the latch $h^3$ is operated to release the box $g$ and the front member $k$ of the camera box is pressed rearwardly, the bellows $j$, $p$, collapse and the mirror and box fold toward the focal plane as illustrated in Fig. 6. The opening in the top of the bellows which is occupied by box $g$, may be stiffened by insertion of wires in the upper folds $x$.

I claim as my invention:

1. A photographic camera comprising the combination with front and rear sections of a camera box and an extensible and collapsible light tight structure connecting them, of a downwardly foldable focusing glass hinged to the rear section of the box and observable through an opening in the collapsible structure when the latter is extended, a downwardly foldable reflector also hinged to the rear section, and a segmental bellows applied around the exposure opening of such section and having an open front closed by the reflector when the camera is in condition for a picture to be focused.

2. A photographic camera comprising the combination with the front and rear sections of a camera box and an extensible and collapsible light tight structure connecting them, of a downwardly foldable focusing glass hinged to the rear section of the box and observable through an opening in the collapsible structure when the latter is extended, a downwardly foldable reflector also hinged to the rear section, a segmental bellows applied around the exposure opening in such section and having an open front closed by the reflector when the camera is ready for a picture to be focused, and means connected with the front section of the box operating to draw the segmental bellows and reflector into proper angular position when the camera is extended for use.

3. A photographic camera comprising the combination with the focal-plane section of the box, the lens section of the box, and a light-tight bellows connecting them whereby the two sections may be extended for use or collapsed of a downwardly foldable focusing box occupying an opening in the top of the bellows when the camera is extended and whose bottom is formed by the focusing glass, a segmental bellows applied around the exposure opening in the focal plane section of the box and having its curved lower end closed and its front side open, a second segmental bellows having its front end open and its sides connected to the focusing box and to the first named segmental bellows, and a downwardly foldable hinged reflector movable in said second segmental bellows and serving in one position to close the open front side of the first named bellows and in another position to exclude light entering the camera through the focusing glass.

4. A photographic camera comprising the combination with the focal-plane section of the box, the lens section of the box, and a light-tight bellows connecting them whereby the two sections may be extended for use or collapsed, of a downwardly foldable focusing box occupying an opening in the top of the bellows when the camera is extended and whose bottom is formed by the focusing glass, a segmental bellows applied around the exposure opening in the focal plane section of the box and having its curved lower end closed and its front side open, a second segmental bellows having its front end open and its sides connected to the focusing box and to the first named segmental bellows, a downwardly foldable hinged reflector movable in said second segmental bellows and serving in one position to close the open front side of the first named bellows and in another position to exclude light entering the camera through the focusing glass, and means connected with the lens section of the box operating to draw the segmental bellows that is applied around the exposure opening and also the reflector into proper angular position when the camera is extended for use.

5. A photographic camera comprising the combination with the lens section and focal plane section of a camera box and an extensible and collapsible light tight structure connecting them, of a downwardly foldable focusing ground-glass hinged to the focal plane section of the box and observable through an opening in the collapsible structure when the latter is extended, a downwardly foldable reflector also hinged to said section, a segmental bellows applied around the exposure opening in said section and whose open front is closed by the reflector when the camera is ready to focus a picture, links connecting the two box sections and constructed to hold them properly separated when the camera is extended, and interior links connecting the front section to said segmental bellows whereby the latter and the reflector are drawn into proper angular position when the camera is extended for use.

6. A photographic camera comprising the combination with a focal plane section, a lens section and an extensible and collapsible structure interposed between them in either extended or collapsed condition, of a focusing glass and a reflector both foldable toward the focal plane and contained within said structure between the said two sections when the camera is collapsed.

7. A photographic camera comprising the combination with a focal plane section, a lens section and an extensible and collapsible bellows interposed between them of a box adapted to occupy an opening in the bellows when the latter is extended, an observation hood attached to the box and foldable thereinto, a focusing glass constituting the bottom of the box and a reflector, the box and reflector being adapted to fold downwardly toward the focal plane when the camera is collapsed.

In testimony whereof, I have hereunto subscribed my name.

LOUIS BORSUM.

Witnesses:
   KATHARINE MacMAHON,
   L. F. BROWNING.